Dec. 13, 1966  R. M. WYMAN  3,291,274
CENTRIFUGAL CLUTCH
Filed Sept. 4, 1964  2 Sheets-Sheet 1

INVENTOR.
RICHARD M. WYMAN
BY
Porter + Meyer
ATTORNEYS

Dec. 13, 1966  R. M. WYMAN  3,291,274
CENTRIFUGAL CLUTCH
Filed Sept. 4, 1964  2 Sheets-Sheet 2

INVENTOR.
RICHARD M. WYMAN
BY
*Porter + Meyer*
ATTORNEYS

United States Patent Office 3,291,274
Patented Dec. 13, 1966

3,291,274
CENTRIFUGAL CLUTCH
Richard M. Wyman, 63 Summer St., Framingham, Mass.
Filed Sept. 4, 1964, Ser. No. 394,410
7 Claims. (Cl. 192—105)

This invention relates to a centrifugal clutch and more particularly to a fly weight actuated centrifugal clutch.

Centrifugal clutches are widely used especially in conjunction with motors which have a low starting torque or a low, slow speed torque. A primary function of such a clutch is to automatically disengage the load from the motor whenever the speed of the motor is less than a predetermined threshold at which the developed torque exceeds the effective load. Normally, the clutch is effective only in the starting cycle in which case the load is applied only after the motor has attained an adequate rotational speed, and hence an adequate torque to withstand the load without stalling. Secondarily a centrifugal clutch acts as a safety device and disconnects the motor from the load if for any reason the load becomes so excessive as to tend to stall the motor.

One known type of automatically actuated centrifugal clutches comprise one or more fly weights as the actuating medium. Such clutches generally comprise a driving member attached to the drive shaft of the motor, a driven member attached to the load, a normally disengaged clutch member connecting the driving member and the driven member and one or more fly weight members associated with the driving member and adapted to cause said clutch member to engage the driven member with the driving member whenever the said fly weight members are subjected to an adequate predetermined centrifugal force as when the driving member reaches a predetermined rotational velocity. This invention relates to automatically actuated centrifugal clutches of the aforesaid general type.

It is the purpose of this invention to provide such a clutch in such manner that it is contained in a totally enclosed housing; that it is easily and readily repairable and adjustable even in the field; that it may be produced simply and cheaply from readily produced parts; and that it operates without exerting any appreciable axial thrust upon the anti-friction bearings contained therein.

These and other purposes and advantages of the clutch of the present invention will be appreciated from the following description, and from the attached drawings in which.

Figure 1:
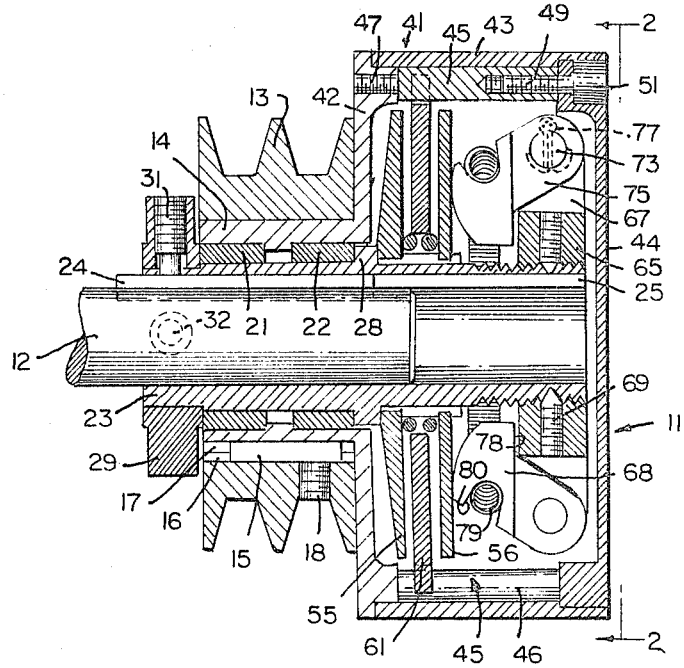
FIG. 1 is an elevational in section along line 1—1 of the clutch of the present invention.
Figure 2:
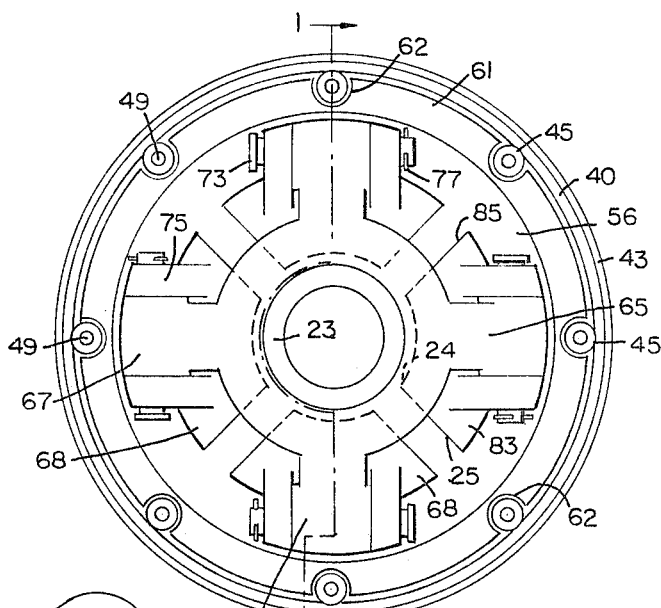
FIG. 2 is an end view in elevation corresponding to line 2—2 of FIG. 1 but with the cover plate removed.

The centrifugal clutch of the present invention indicated generally at 11 is designed to be mounted on a drive shaft 12 such as the output shaft of a motor, an engine or other power source, and to transmit the power delivered therefrom to a power output indicated in FIG. 1 as sheaves 13 mounted coaxially with shaft 12 in a position surrounding said shaft. Sheaves 13 are mounted on output sleeve 14 and affixed thereto by key 15 which is arranged partially in keyway 16 in sheaves 13 and in keyway 17 in output sleeve 14 and by one or more set screws 18.

Output sleeve 14 is in turn mounted on a pair of anti-friction bushings 21 and 22. Bushings 21 and 22 are mounted on a cylindrical portion 38 of input sleeve 23. Input sleeve 23 is mounted on drive shaft 12 to which it is keyed by key 24 which is arranged partially in keyway 25 in sleeve 23 and partially in keyway 26 in shaft 12.

Lateral movement of output sleeve 14 and hence output sheave 13 relative to input sleeve 23 and drive shaft 12 is prevented by the provision of an internal shoulder 27 which extends inwardly from the inner cylindrical surface of output sleeve 14 between bushing 21 and bushing 22; an upstanding shoulder 28 on input sleeve 23 arranged adjacent the outer edge of bushing 22; and lock collar 29 adapted to be arranged adjacent the outer edge of bushing 21. Each of said elements, shoulder 27, shoulder 28 and lock collar 29, is so arranged that it contacts only the respective bushing 21 or 22 and does not contact the sleeve 14 or 23 to which it is not affixed. Lock collar 29 surrounds cylindrical portion 37 of input sleeve 23 and is provided with a pair of set screws 31 and 32. Set screws 31 and 32 are arranged to pass through tapped holes 33 and 34 respectively in collar 29 and through holes 35 and 36 respectively in input sleeve 23. Thus set screws 31 and 32 not only lock collar 29 into place relative to input sleeve 23, but also lock input sleeve 23 in position relative to drive shaft 12. Set screw 31 is preferably arranged to press against key 24 and similarly set screw 18 is arranged to press against key 15. Preferably the cylindrical outer portion 37 of input sleeve 23 adapted to receive lock collar 29 has a lesser diameter than the cylindrical portion 38 adapted to receive bushings 21 and 22 in order to provide an abutting surface on input sleeve 23 to facilitate the exact positioning of lock collar 29.

Thus it will be noted that sheaves 13 or other drive means mounted on output sleeve 14 occupies substantially the same position relative to drive shaft 12 as would a conventional drive means mounted on that shaft in the absence of clutch 11. Although output sleeve 14 is rotationally isolated from drive shaft 12 by bushings 21 and 22, any shock or other non-rotational force exerted on output sleeve 14 is transmitted directly to drive shaft 12 through bushings 21 and 22 in the same manner as if the fittings, such as sheaves 13 mounted on output sleeve 14 were to be directly mounted on drive shaft 12. At the same time any such shock is not transmitted through the clutching member but rather such member remains relatively isolated from the effect of such shock.

The clutching members of clutch 11 are all contained within housing 41 which comprises flange 42 formed at the input end of output sleeve 14; cylindrical side plate 43, and circular cover plate 44. Side plate 43 interfits a groove provided for that purpose about the periphery of flange 42 and cover plate 44 interfits a groove 40 provided for that purpose internally of side plate 43 adjacent the end of side plate 43 opposite flange 42. Housing 41 is held together by a plurality of receiving pins 45 arranged parallel to the axis of input sleeve 23 immediately adjacent the inner periphery of cylindrical side plate 43. Each receiving pin 45 comprises a cylindrical portion 46 and a threaded portion 47 said threaded portion having a reduced diameter adapted to enter in and cooperate with tapped holes 48 formed in and arranged in a circle in flange 42. Receiving pins 45 are evenly spaced about said circle in flange 42. Although the exact number of receiving pins 45 is a matter of choice, normally at least five and preferably at least eight such pins should be provided. The end of each receiving pin 45 opposite threaded extension 47 is provided with an internally threaded portion 49 adapted to receive cap screws 51 which pass through suitable apertures in cover plate 44. Thus when receiving pins 45 are screwed into flange 42 and cap screws 51 are screwed into receiving pins 45, cylindrical side plate 43 is securely clamped between flange 42 and cover plate 44 and cover plate 44 is securely fastened into place.

That portion of input sleeve 23 located internally of housing 41 is provided with a splined portion 52 adjacent shoulder 28 and a threaded cylindrical portion 53 adjacent splined portion 52. The effective outside diameter of splined portion 53 is less than the diameter of shoulder 28 and the effective diameter of threaded cylindrical portion 53 does not exceed the diameter of the splined portion at the base of the splines. Splined portion 52 is provided with a plurality of outstanding splines 54 and is adapted to receive in axially sliding relation a plurality of driving disks 55, 56 each provided with an internally splined central aperture 57, 58 respectively adapted to cooperate with splined portion 52. Driving disk 55 which is adapted to be located adjacent shoulder 28 is provided with a plane surface on the side facing driving disk 56 and is provided with a thickened section towards its central portion for added strength. Driving disk 56 is provided with a plane surface on both sides.

A coil spring acting as the clutch release spring 59 is provided surrounding splined portion 52 of input sleeve 23 with its ends resting against the facing sides of driving disk 55 and driving disk 56 adjacent splined portion 52. Spring 59 normally urges driving disk 55 and driving disk 56 apart.

A driven disk 61 is provided between driving disk 55 and driving disk 56. Driven disk 61 has an outside diameter slightly less than the inside diameter of side plate 43 and is provided with a plurality of cut-out portions 62 spaced about its periphery adapted to cooperate with receiving pins 45 to permit free passage of said pins therethrough, thereby permitting unrestricted axial movement of disk 61 relative to flange 42. Driven disk 61 is provided with an internal aperture 63 adapted to permit the free passage of input sleeve 23 and spring 59 therethrough. Both surfaces of driven disk 61 are plane.

Disks 55, 56 and 61 may be made of any suitable material, preferably one such as a cast metal that exhibits a minimum degree and rate of distortion under heat or pressure. The flat mating surfaces of disks 55, 56 and 61 may be covered with any suitable clutch facing if desired.

It will be noted that disks 55 and 56 since they are mounted for sliding axial motion on splined portion 52 of input sleeve 23 rotate with input sleeve 23 and that disk 61, since it is similarly mounted in housing 41 with receiving pin 45 acting in the manner of splines rotates with housing 41. In the normal at rest position of the clutch disks 55 and 56 are urged apart and out of contact with disk 61. While disks 55 and 56 are separated and out of contact with disk 61, disks 55 and 56 may rotate with input cylinder 23 without imparting any rotary motion to disk 61 and hence housing 41 and output sleeve 14. Means are provided to urge disks 55 and 56 toward each other, thereby forcing disk 61 which is located between disks 55 and 56, into contact with both. As soon as firm contact between disks 55, 61 and 56 has been established disk 61 is forced to rotate at the same velocity as disks 55 and 56 and hence output sleeve 14 to which disk 61 is connected assumes the velocity of input sleeve 23.

The means for urging the clutch plates (i.e. disks 55, 56 and 61) into mating contact with each other are provided by fly weight assembly 64. Fly weight assembly 64 comprises a spider 65 which is provided with a threaded central aperture 66 adapted to engage and cooperate with threaded portion 53 of input sleeve 23 and a plurality of radially extending peripheral arms 67 each adapted to receive a fly weight 68. Spider 65 may be adjusted in position toward or away from flange 42 by being rotated relative to input sleeve 23, and once so adjusted is held in place by a plurality of set screws 69 which pass through suitable apertures 70 provided for that purpose in the body of spider 65 and cooperate with longitudinal locking grooves 71 provided in threaded portion 53 of input sleeve 23. Each fly weight 68 is pivotally mounted on the appropriate peripheral arm 67 of spider 65 by means of a pivot pin 73 which passes through aperture 74 provided in pivot arm 75 of fly weight 68 and through aperture 76 in peripheral arm 67. Normally a pair of pivot arms 75 is provided one on each side of arm 67 and pivot pin 73 is secured in position by a suitable fastener indicated as cotter pin 77.

Each fly weight 68 is provided with a rear shoulder 78 adapted to rest against spider 65 in its normal at rest position. A circular coil retracting spring 49 passing around groove 80 provided on the top (away from input sleeve 23) side 83 of each fly weight 68 urges each fly weight toward the normal position with shoulder 78 in contact with spider 65.

The surface 82 of fly weight 68 opposite pivot 73 is adapted to rest against the rear surface of disk 56. Surface 82 acts as a periphery cam surface and is so shaped that as fly weight 68 is urged away from its at rest position by the centrifugal force exerted thereon by the rotation of input sleeve 23 disk 56 is urged toward flange 42 forcing disks 56, 61 and 55 into mating contact.

Figure 4:
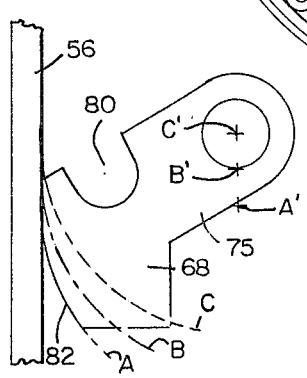
FIG. 4 is an elevational section showing details of a fly weight.
Figure 3:
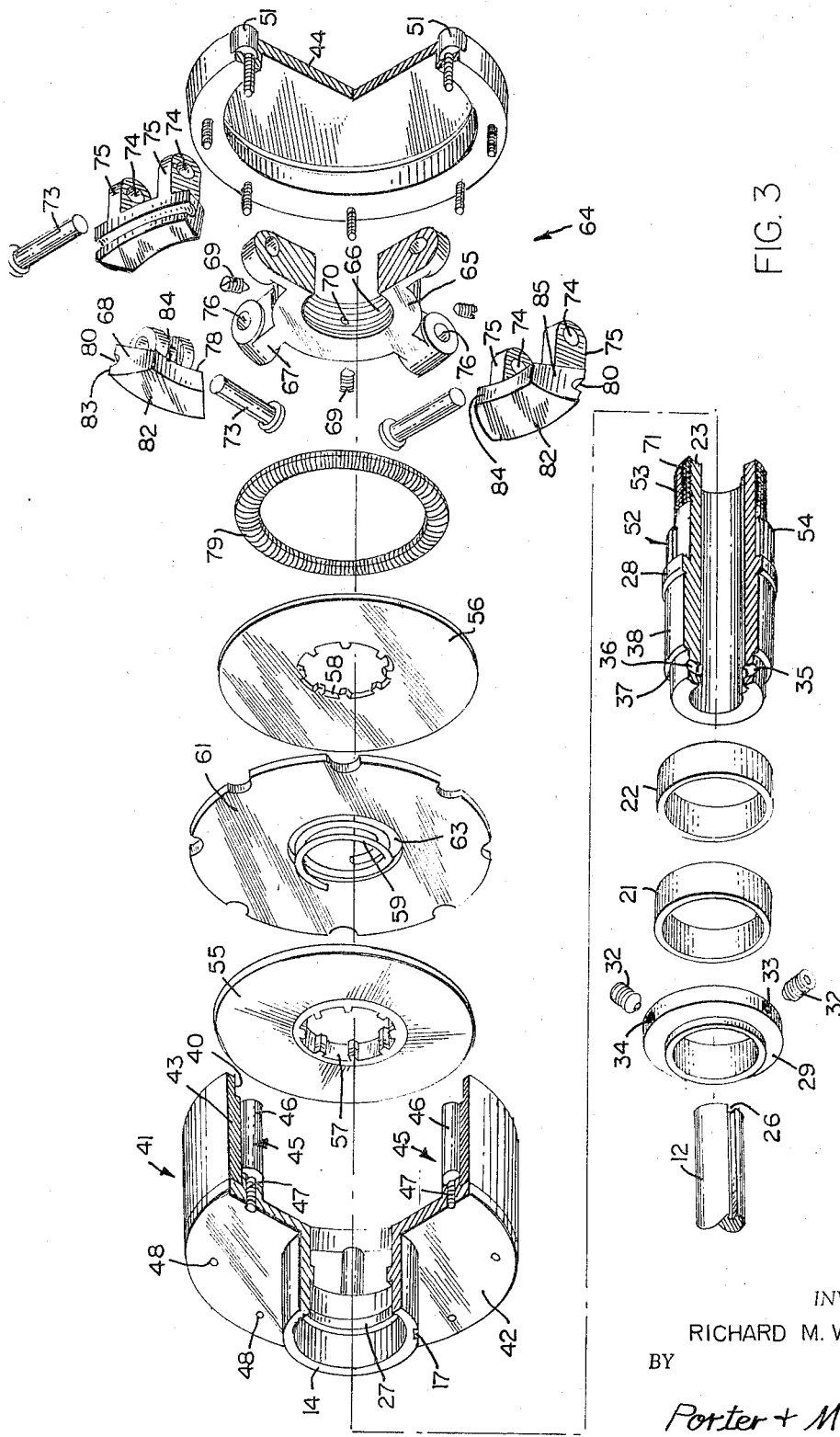
FIG. 3 is an exploded perspective view in partial section showing the individual components of the clutch of the present invention.

Surface 82 is preferably so shaped that as fly weight 68 rotates about pivot 73 contact between surface 82 and disk 56 is along a line parallel to the axis of pivot 73. The preferred way in which this may be accomplished is shown in FIG. 4 where line C represents the tangential arc about point C' (the central pivot 73) line B an arc of the same radius as line C about point B' and line A an arc of the same radius about point A'. The preferred contour for surface 82 is that of line A. Line C represents the condition wherein fly weight 68 could be displaced without moving disk 56. Line B represents an intermediate condition wherein the linear movement of disk 56 per radial movement of flyweight 68 is lesser than in the case of the contour of line A. It will be noted that points B' and A' are displaced from point C' along a line parallel to the face of disk 56 when fly weight 68 is in its normal at rest position so that each of the arms A, B and C contact the surface of disk 56 tangentially. Obviously the precise shape of cam surface 82 may be changed as desired provided substantially a line contact is preserved between surface 82 and the face of disk 56 and provided that the throw of the cam surface 82 is such that disks 56, 61 and 55 are forced into mating contact at least by the time fly weight 68 has been entirely displaced from its normal at rest position under the influence of the centrifugal force exerted thereon by the rotation of input sleeve 23.

Top surface 83 of fly weight 68 is shaped along a curve such that when fly weight 68 is fully displaced surface 83 conforms generally to the inner portions of housing 41. Bottom surface 84 (the side opposite surface 83) is similarly shaped on a curve such that surface 84 clears the outer periphery of cylindrical input sleeve 23 when fly weight 68 is in its normal at rest position with shoulder 78 in contact with spider 65. Sides 85 are preferably shaped to lie along a line parallel to a radius from the center of input sleeve 23 when fly weight 68 is in its normal at rest position, thereby giving fly weight 68 a wedge shape that results in the maximum mass.

The operation of the clutch is very simple and direct. As drive shaft 12 starts to rotate so also do input sleeve 23, disk 55, disk 56 and spider 65 since these are all connected together for rotary motion. As soon as spider 65 rotates fast enough so that the centrifugal force exerted on each fly weight 68 to overcome the restraining force exerted on all the fly weights 68 by retracting spring 79, each of fly weights 68 starts to rotate about its pivot 73. Because of the camming action of cam surface 82 of each fly weight 68, this motion forces disk 56 toward disk 61 against the pressure exerted by clutch release spring 59. As soon as disk 56 contacts disk 61 disk 61 is moved toward disk 55 and ultimately as fly weights 68 continue to rotate about their pivot 73 disks 56, 61 and 55 come into mating contact. The rotational force exerted upon disk 61 by disks 55 and 56 is transmitted through receiving pins 45 to housing 41. Since housing 41 is directly connected to output sleeve 14 this rotary force is imparted to sheaves 13. As soon as the rotational force exerted upon disk 61 is sufficient to exceed the resistance of the load sheave 13 begins to rotate and upon complete mating of disks 55, 61 and 56 sheave 13 assumes the velocity of drive shaft 12.

If for any reason the velocity of clutch 11 is slowed sufficiently for the force of retracting spring 79 to overcome the centrifugal force exerted upon fly weight 68, fly weights 68 tend to return toward their normal at rest position. When this happens clutch release spring 59 forces clutch plates 55 and 56 apart moving these plates partially or completely out of contact with clutch plate 61, thus permitting housing 41 and hence output sleeve 14 to slow down or to stop.

The design of the clutch of this invention has many obvious advantages. The fact that the driven element surrounding the driving elements permits housing 41 to totally enclose all of the working parts thus permitting the clutch to be used even in exposed location. This arrangement also permits output sleeve 14 and thus any power take off such as sheaves 13 to be arranged coaxially of the drive shaft 12 at the same position as such power take offs are normally mounted on drive shaft 12 so that any force exerted on the power take off is transmitted to the drive shaft 12 at the point where such force is intended to be withstood and none of the force is required to be absorbed by clutch 11 itself.

Since the mating surfaces of the clutch plates or disks 55, 56 and 61 are designed to be absolutely flat, these disks can be machined to a high degree of accuracy in an inexpensive manner. This very flatness gives the mating surfaces a high degree of clutching efficiency per unit area. In addition, since the clutch plates serve no other purpose in the combination these plates may be made of materials best suited for this particular purpose.

Adjustment of clutch 11 to compensate for any wear of disks 55, 56 and 61 is very easily accomplished. Cover plate 44 of housing 41 is very easily removed by backing out set screws 51 and when removed cylindrical side plate 43 which is clamped into position solely by cover plate 44 may also be removed. The position of spider 65 is readily adjusted by loosening set screws 69 and rotating spider 65 about threaded portion 53 of input sleeve 23. As soon as spider 65 and fly weight 68 are properly positioned spider 65 can be brought into position by set screws 69. The positions of suitably spaced longitudinal grooves 71 on the surface of threaded portions 53 permit a positive locking action without there being any danger of damage to the threads. If so desired spider 65 may easily be removed in the same manner and once removed plates 55, 56 and 61 can be slid off of input sleeve 23 and/or receiving pins 45 and replaced. All of this can be accomplished in the field in a few minutes' time using only a simple tool such as a screwdriver or an Allen wrench depending on the nature of the set screws and cap screws without difficulty.

A primary advantage lies in the fact that there is no possibility of any axial pressure within clutch 11 that can be transmitted as an end thrust against the bearings between the input and output elements. Such end thrust frequently promotes excessive wear in ordinary centrifugal clutches. It will be noted that plates 55 and 56 are free to slide axially along splines 54 provided in input sleeve 23 and that disk 61 is likewise free to float axially relative to the nest of receiving pins 45. When the disks are fully mated the outside edge of disk 55 presses against the side of shoulder 28 provided in input sleeve 23 while disks 56 and 61 except as they are restrained by disk 55 are still free to move axially. Such mating is caused by fly weights 68 which are mounted on spider 65 also mounted on input sleeve 23. Thus the axial pressure exerted by the action of fly weights 68 against the disks is entirely exerted on input sleeve 23 between shoulder 28 and spider 65 and there is no possibility of any portion of this pressure being exerted on any other part of the assembly.

Under varying conditions of use it may be desirable to adjust the operation of the centrifugal clutch of the present invention so that it will engage and disengage at varying present rotational speeds or after differing time lags. Such adjustments may readily be accomplished in at least five different ways:

(1) Retraction spring 79 may be replaced by a spring having a different degree of tension.

(2) Clutch release spring 59 may be replaced by a spring having a different degree of compression.

(3) The distance between spider 65 and disk 56 may be varied thus varying the distance that fly weights 68 must travel before the clutch plates mate, a greater distance requiring a higher centrifugal force and hence a higher rotational speed of shaft 12.

FIG. 4, the greater the eccentricity, the quicker the enweights having a different cam contour. As shown in FIG. 4, the greater the eccentricity, the quicker the engagement of the disks.

(5) Fly weights 68 may be replaced by a set of fly weights having a different total mass or alternatively weights may be added to the fly weight of a given set.

It is obvious that any or all of these alternatives may be employed in any combination and that any such change may readily be made on a centrifugal clutch in position in the field. It will be recognized of course that any such variation that alters the total disk squeezing pressure may also alter the clutch holding ability, the greater the pressure the more power that can be transmitted through the clutch.

Normally for a given type of clutch plate operating a given pressure, the total power that can be transmitted through the clutch is a function of the total effective area of the clutch plates. One particular advantage of clutch designed according to the present invention is that this area may be altered in manufacture with relative ease. Where radial clearance is no problem, this can be accomplished merely by altering the diameter of plates 55, 61 and 56, of housing 41 and of spider 65 without altering the length of the unit.

On the other hand, if radical clearance is limited but axial clearance is no problem, additional clutch plates may be added merely by lengthening the splined portion 52 of input sleeve 23 and cylindrical side plates 43 along with the associated receiving pins 45. It will be understood of course that the combination of three disks shown in the drawing represent merely the minimum number that are useful, and that the maximum number of plates that may be used are substantially unlimited. Such additional plates are added in pairs each pair comprising a driven disk 61 and a sliding driving disk 56, together with an additional clutch release spring 59. The additional disks are arranged such that a driven disk 61 is always situated between adjoining driving disk 56 and the additional clutch release spring 59 are arranged between each such additional pair of driven disks 56. Thus in each case the total number of disks will be an odd number and the total of the driving disks will always be one more than the total of the driven disks. As additional disks are added it may be necessary to increase the mass of fly weights 68 and/or reduce the force of springs 59 or 79 to overcome the greater resistance to mating of a greater number of disks.

The design of the parts of the clutch of the present invention is such that production costs are low even when production runs are limited. Extensive tooling is not necessary since most of the parts are capable of being made in any well equipped machine shop. In addition there is a high degree of interchangeability of individual parts amongst various models having various sizes and capacities.

I claim:
1. A centrifugal clutch adapted to be coupled to the drive shaft of a drive means and to rotate therewith comprising a cylindrical input element adapted to surround said drive shaft and to be attached thereto, an anti-friction bearing means mounted on said input element in a position overlying said drive shaft, a cylindrical output element mounted for independent rotation on said bearing means coaxial with said input element, said output element having power output means surrounding said drive shaft and having a cylindrical housing portion of enlarged diameter surrounding said input element and extending beyond the end of said drive shaft, a plurality of disk-like clutch plates arranged within said housing, a portion of said plates mounted on said input element in such manner as to rotate therewith but to slide axially relative thereto, the remaining said plates mounted in said housing in such manner as to rotate therewith but to slide axially relative thereto, said input element mounted plates alternating with said housing mounted plates in said arrangement with the two end plates of said arrangement both being input element mounted plates, spring means surrounding said input element and normally acting to urge adjoining input element mounted plates apart and out of contact with the intervening housing mounted plate in each instance, abutting means associated with said input element abutting the end plate adjacent said bearing means and arranged to keep the end said input element mounted plate adjacent thereto out of contact with any portion of said output element, and plate compression means associated with said input element adjacent the other end of said arrangement of plates adapted to force said input element mounted plates and said housing mounted plates toward said abutting means and into contact with each other whenever said input element rotates above a predetermined velocity said plate compression means comprising a spider having a plurality of outstanding arms mounted on said input element, a fly weight pivotally mounted on each arm of said spider, each said fly weight adapted to rotate about its pivot into direct and displacing contact with the end plate of said arrangement of plates in response to the rotation of said input element, and spring means associated with said fly weights, said spring means normally acting to urge said fly weights to a normal position out of displacing contact with said end plate.

2. A centrifugal clutch as claimed in claim 1 wherein the axis of the pivoted mounting of each said fly weight lies in a plane parallel to the plane of said end plate and wherein the face of each said fly weight adjacent said end plate is shaped to provide line contact between said face and said plate as said fly weight is displaced about its pivot.

3. A centrifugal clutch as claimed in claim 1 wherein said spider is mounted on said input element in such manner that the axial position of said spider relative to said arrangement of plates may be adjusted.

4. A centrifugal clutch as claimed in claim 1 wherein said spring means associated with said fly weights comprises a continuous spring arranged in a cooperating groove formed on the top surface of each said fly weight.

5. A centrifugal clutch as claimed in claim 1 wherein said cylindrical housing portion comprises a side member and two end members interfitting to totally enclose said clutch plates and said plate compression means.

6. A centrifugal clutch as claimed in claim 1 wherein in the arrangement of clutch plates at least one housing mounted plate is provided wherein the total number of input element mounted plates exceeds the total number of housing mounted plates by one, and wherein each surface of each plate adapted to mate with a surface of another plate is substantially flat and planar.

7. A centrifugal clutch as claimed in claim 6 wherein said input element is provided with a plate engaging spline portion and each input mounted plate is provided with a spline engaging central aperture, wherein said housing is provided with a plurality of spline elements arranged evenly spaced on a radius near the outer periphery thereof the axis of each said spline element being parallel with the axis of the input element and the outer periphery of each housing mounted plate is provided with a plurality of cut away portions adapted to cooperate in sliding engagement with said spline elements, and wherein each housing mounted plate is provided with a central aperture adapted to clear said splined portion of said input element.

References Cited by the Examiner

UNITED STATES PATENTS

| 1,718,105 | 6/1929 | Benn | 192—105 |
| 1,823,129 | 9/1931 | Smith et al. | 192—105 |
| 1,915,772 | 6/1933 | Ziegler. | |
| 2,441,928 | 3/1965 | Croft et al. | 192—105 |

FOREIGN PATENTS 267,946  8/1927  Great Britain.

DAVID J. WILLIAMOWSKY, *Primary Examiner.*

BENJAMIN W. WYCHE, *Examiner.*